United States Patent [19]
Snyder et al.

[11] Patent Number: 5,640,704
[45] Date of Patent: Jun. 17, 1997

[54] PROCESS FOR SOLIDIFICATION AND IMMOBILIZATION OF HARMFUL WASTE SPECIES

[76] Inventors: Thomas S. Snyder, 214 Briarcliff Ave., Oak Ridge, Tenn. 47830; David C. Grant, 1018 Creekvue Dr., Gibsonia, Pa. 15044; James T. Hallman, 104 Chancellors La., Knoxville, Tenn. 37922; Martin Brownstein, 8644 Charles Towne Ct., Knoxville, Tenn. 37923; Dwight Goad, Rte. 3, Box 185, Kingston, Tenn. 37763; Carol Kelly, 139 First St., Rockwood, Tenn. 37854; Lori West, 413 N. 3rd St., Kingston, Tenn. 37763

[21] Appl. No.: 506,057
[22] Filed: Jul. 24, 1995
[51] Int. Cl.$^6$ .................................................. G21F 9/00
[52] U.S. Cl. ........................ 588/4; 588/256; 106/769
[58] Field of Search .................... 588/4, 252, 256; 106/769

[56] References Cited

U.S. PATENT DOCUMENTS

| | | | |
|---|---|---|---|
| 4,209,335 | 6/1980 | Katayama et al. | 106/89 |
| 4,329,179 | 5/1982 | Kutta | 106/97 |
| 5,245,122 | 9/1993 | Smith | 588/257 |
| 5,304,710 | 4/1994 | Kigel et al. | 588/257 |
| 5,347,077 | 9/1994 | Hooykaas et al. | 588/257 |
| 5,376,283 | 12/1994 | Hooykaas | 210/751 |
| 5,387,740 | 2/1995 | Sasal et al. | 588/257 |
| 5,429,751 | 7/1995 | Hooykaas | 210/751 |
| 5,498,828 | 3/1996 | Matsuda | 588/252 |

*Primary Examiner*—Ngoclan Mai

[57] ABSTRACT

The present invention provides methods and processes for immobilizing and solidifying harmful heavy metal and radioactive species within a waste material. The processes of the present invention are also particularly advantageous for immobilizing and solidifying nitrate compounds with a waste material. One embodiment of the present invention is a method that can be carried out by admixing the waste material with cement and a complexant compound to form a grout admixture. Preferably, the complexant compound is an iron compound that can form a hydrated iron oxide in the presence of an aqueous solution. This grout admixture is then allowed to cure and solidify. The grout admixture is placed within a suitable containment vessel for final storage and disposal.

15 Claims, 1 Drawing Sheet

PROCESS FOR SOLIDIFICATION AND IMMOBILIZATION OF HARMFUL WASTE SPECIES

BACKGROUND OF THE INVENTION

Various industrial processes result in the production of waste streams containing toxic, hazardous, or radioactive waste species. Commonly these waste streams are in the form of aqueous solutions or dispersions that contain heavy metals and/or radionuclides in either dissolved or precipitated forms. These waste streams can also contain various other harmful compounds such as nitrates and phosphates. Examples of such waste streams are those wastes that result from plating operations for the aluminum plating of radioactive materials. Such plating operations result in a waste sludge material that contains nitrate compounds, nickel compounds, and radioactive compounds. These waste streams must be treated to meet various governmental regulations prior to disposal.

One way of treating these waste streams is to admix the waste with cement to form a grout admixture. This admixture is then allowed to cure and the waste compounds are immobilized in the hardened mass to an extent. A way to test the efficiency of the immobilization is to perform a toxicity characteristic leaching procedure (TCLP) test. This form of waste treatment is useful; however, the toxic, hazardous, or radioactive species frequently is not immobilized sufficiently and the cured waste/cement mass falls to pass the TCLP testing.

Other techniques used to treat such waste streams includes vitrification processes. In such processes the waste is added to a molten matrix, typically a glass matrix, where the aqueous and volatile matter is evaporated and the heavy metals, radioactive species, and other harmful compounds are entrapped in the glass material. The glass is then cooled and allowed to harden to solidify and immobilize the waste. However, such techniques are generally reserved for relatively higher level wastes due to the prohibitive costs of vitrification processing.

Thus, there exists a need in the art to develop processes for the efficient, economical, and reliable waste stream solidification and immobilization of harmful species. Ideally such an improved process would utilize the cement solidification technology, which is relatively inexpensive and commercially available, and improve upon that technology to provide for superior immobilization results.

SUMMARY OF THE INVENTION

The present invention provides methods and processes for immobilizing and solidifying harmful heavy metal and radioactive species within a waste material. The processes of the present invention are also particularly advantageous for immobilizing and solidifying nitrate compounds with a waste material.

One embodiment of the present invention is a method that can be carried out by admixing the waste material with cement and a complexant compound to form a grout admixture. Preferably, the complexant compound is an iron compound that can form a hydrated iron oxide in the presence of an aqueous solution. This grout admixture is then allowed to cure and solidify. Preferably, the grout admixture is treated to remove excess aqueous fluid from the admixture, such as by way of filtration. The grout admixture is placed within a suitable containment vessel for final storage and disposal.

In particular, one embodiment of the present invention is a method for the immobilization of hazardous and/or radioactive species present within a waste material. The method is practiced by blending 100 parts by weight of a waste material comprising water and at least one heavy metal species or at least one radioactive species with from about 5–50 parts by weight of cement and a complexant comprising an iron compound, wherein the weight ratio of elemental iron to cement is from about 1:3 to about 1:50, to form a grout material. Excess aqueous fluid is separated from said grout material to form a condensed grout waste, and this condensed grout waste is allowed to cure and solidify.

The presence of the complexant compound provides for superior immobilization and solidification of the various potentially harmful species, such as heavy metals, radionuclides, and nitrates. In particular, iron has been found to greatly enhance the immobilization and solidification performance of the cement.

DETAILED DESCRIPTION OF THE INVENTION

Figure 1:
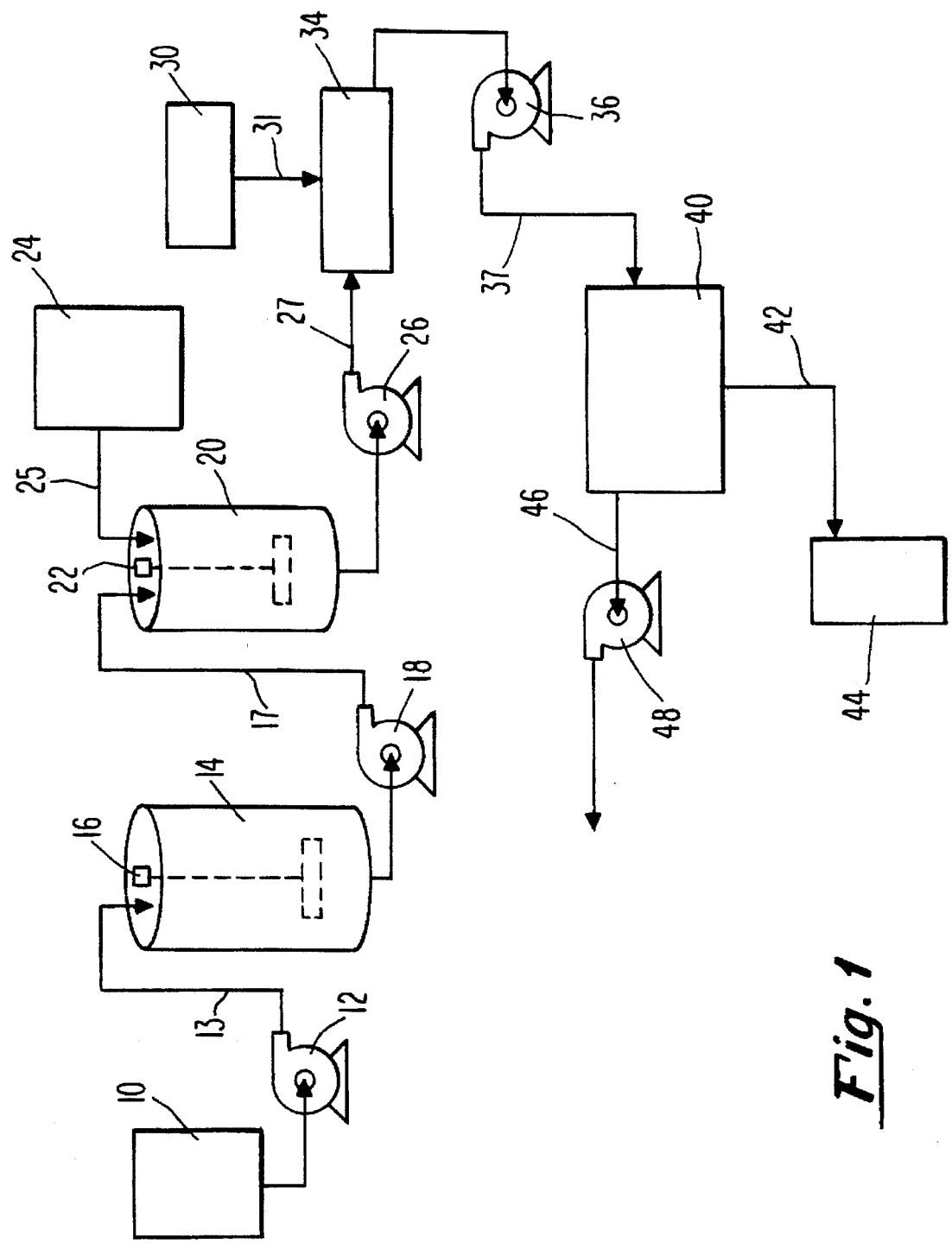
FIG. 1 is a depiction of a process flow diagram for one embodiment of the present invention.

The present invention provides methods for immobilizing and solidifying waste materials that contain either heavy metals, radionuclides, or nitrate compounds that result in the waste being classified as either hazardous, radioactive, and/or mixed waste. These waste materials must be properly treated prior to disposal to ensure that the toxic materials are immobilized to an acceptable level. The methods of the present invention provide for the acceptable immobilization and solidification of such wastes by means of admixing a cement-based composition to the wastes to produce a cured, solidified mass that effectively immobilizes the toxic waste species.

The waste materials that are contemplated as being processed by the inventive methods set forth herein are those containing waste materials that are classified as either toxic, hazardous, and/or radioactive. Typically such wastes contain heavy metals like metals from Groups VIII, IB, IIB, VIIB, VIB, VB, and IVB, particularly metals such as nickel, chromium, tin, lead, copper, vanadium, selenium, or mercury. These metals are usually complexed in either soluble salt forms or precipitated as relatively insoluble metal hydroxides or oxides. The waste material can also contain radioactive species like uranium or cesium compounds present in similar molecular form to the heavy metals described above. Cesium, an alkali metal, is generally highly soluble and is relatively mobile from a disposal standpoint.

The waste material can contain various amounts of the heavy metal or radioactive species. Generally, however, these species will be present individually in an amount less than 20% wt., and more commonly less than 10% wt., but typically more than about 0.1% wt., and more commonly more than about 0.5% wt. of the overall waste material on a dry basis. Typically, the radioactive species, such as uranium or cesium, will be present individually below about 10% wt., but in an amount of at least about 0.05% wt., and more commonly in an amount of at least about 0.5% wt., and in some cases more than about 1% wt.

The waste material is typically in the form of an aqueous dispersion, such as a sludge or liquor that contains solubilized nitrate and phosphate compounds. Common industrial examples of such waste materials include sludges and liquors generated by the operation of and decontamination of electrolytes from plating operations. One particular example is the sludge that results from the aluminum or nickel cladding of uranium oxide pellets to prepare nuclear reactor target fuel for weapons production. Typical waste materials can contain from about 5-90% wt. water, and it is generally preferred to reduce the water content to below about 75% wt. prior to treatment of the waste to reduce disposal costs. Typical solids contents range from about 10-95% wt., commonly from about 10-50% wt., and more commonly from about 20-45% wt. The water content can be lowered by filtering the waste by means of conventional techniques such as pressure filtration or evaporation. Such typical waste material is commonly referred to as a sludge, and the heavy metal or radioactive species can either be present in dissolved or precipitated form.

The waste material is then treated to immobilize and solidify the desired waste species such as the heavy metals and any radionuclide species. The waste material is admixed with a cement material that acts to provide a solidification matrix upon curing the resultant admixture. Various cement materials are commercially available and are all readily employed in the present invention, including microfine cements. Preferred cement materials are the Portland cement materials that are made by heating a mixture of limestone and clay, containing oxides of calcium, aluminum, iron, and silicon, in a kiln and pulverizing the resultant clinker. The most common constituents used to manufacture Portland cement include: $CaO$, $SiO_2$, $Al_2O_3$, $Fe_2O_3$, $MgO$, $SO_3$, $Na_2O$, $K_2O$, $CO_2$, $H_2O$, and $CaSiO_5$. The calcium oxide reacts with the acidic compounds at high temperatures to yield portland cement clinker that contains the following compounds: $Ca_3O_3$, $CaSiO_5$, $CaSiO_4$, $Ca_3Al_2O_5$, and $Ca_4Al_2Fe_2O_{10}$. The Portland cements are available as the Portland Type I and Type II cements, with the Portland Type I cement being preferred. The amount of cement to be admixed with the waste material is primarily dependent on the water content of the waste material. In the preferred processes of the present invention the water content is from about 40-75% wt., more preferably from about 50-70% wt., of the waste material. In such instances, the amount of cement to be admixed with about 100 parts by weight of waste material is from about 5-50 parts by weight, preferably about 5-35 parts by weight, more preferably from about 10-25 parts by weight.

The immobilization of the desired waste species, such as the heavy metal and/or radionuclide species, is advantageously enhanced by the incorporation of a complexant compound into the waste material and cement admixture. The preferred complexant compound is one that contains iron. It is believed that the iron, when present in the aqueous-based waste material mixture, attains the hydrated ferric or ferrous state to form hydrous iron oxides that act as inorganic ion exchangers and that co-precipitate the heavy metal (toxic) and radionuclide (radioactive) constituents. The hydrous iron oxide that is beneficial in the grout admixture of the waste material and the cement can be provided in the form of a hydrous iron oxide, however such forms are more expensive than other iron compounds. Thus, it is preferred to add the iron in the form of a commonly available salt, such as a Group VIIA, VIA, or VA salt, typically such as a sulfate, chloride, or phosphate salt of iron. The iron can take either its ferric or ferrous state in such salts. Iron in the form of $FeSO_4$ has been found to be particularly suited for incorporation into the present invention.

The iron is thought to be particularly beneficial in providing an ionic exchange site to help bind the radionuclides, particularly uranium, and co-precipitating them into insoluble species for better fixation within the grout crystalline structure formed from the cement. The iron species is thought to beneficially reduce the valence of the mobile uranium species to render such species into an immobile state.

The amount of iron to be added to the admixture can be defined as the amount of elemental iron admixed in relation to the amount of cement to be added, and generally the weight ratio of elemental iron to cement is from about 1:3 to about 1:50, preferably from about 1:5 to about 1:35, and more preferably from about 1:10 to about 1:20.

Additional complexants can also be used in the processes of the present invention in addition to the iron compound. Such compounds as sodium sulfide and organic chitosan can be used in amounts of weight ratios of those materials to cement of from about 1:1 to about 1:10, preferably from about 1:2 to about 1:5. If the waste material contains such compounds as cesium or other daughter or activation products, then such complexants as zeolites or organic ion exchange media can be additionally added with the iron compound, generally in amounts of from about 1-50% wt. of the iron compound.

One process of the present invention is depicted in FIG. 1. The waste material is stored in a waste storage tank 10. The waste material is then transported via line 13 by means of pump 12 into the waste mixing tank 14. The waste material is blended into a homogeneous state by means of agitator 16. This homogenized waste material is then transferred via line 17 by means of pump 18 into the waste blending tank 20. The complexant material is then admixed with the waste material. The complexant is transferred from complexant tank 24 via line 25 into the waste blending tank 20. The complexant and waste material are then blended by means of agitator 22. This complexant/waste blend is then transferred via line 27 by means of pump 26 to a high intensive mixer 34. Cement, from cement tank 30, is transferred via line 31 to the intensive mixer 34. The intensive mixer 34 is designed to provide for the efficient blending of the waste material, complexant, and cement materials to form a grout admixture. Such mixers are commercially available in various design capacities.

Following the blending of the waste material, complexant, and cement materials in the intensive mixer 34, the resultant grout admixture material is transferred via line 37 by means of pump 36 to filter 40. The filter 40 can be any of a various array of possible designs, such as a vacuum type filter or a high pressure filter press. The purpose of the filter 40 is to drain off excess aqueous fluids from the filter 40 that are transferred via line 46 by means of pump 48 to a separate storage or waste removal facility. The resultant filter cake is then conveyed via line 42 to a suitable containment vessel 44. The containment vessel 44 can be of any commercially available design and generally will be dictated by the nature of the solidified waste. The waste material, now immobilized and solidified in the grout material and complexant, is allowed to cure for a sufficient period of time in the containment vessel 44, typically such curing times being from about 8-72 hours.

In a preferred embodiment the grout composition containing the waste material, complexant, and cement is washed with an aqueous solution while being treated at the filter 40 to remove easily mobilized nitrate compounds. The aqueous solution can contain surfactants to improve the efficiency of this washing step.

EXAMPLE 1

In this example, a waste sludge formed from a nickel plating of uranium operation is treated according to the present invention to effectively immobilize and solidify the waste material species. The chemical analysis of the waste is set forth in Table 1 wherein the elemental results are shown by either inductively coupled plasma spectrophotometry (ICP), atomic absorption (AA), ion chromatography (IC), or ion selective electrode (ISE). The values are in weight percent on a dry basis.

TABLE 1

| Sludge Chemical Analysis | |
|---|---|
| ELEMENT | DRY WT. % |
| Al(ICP) | 11.145 |
| Ca(ICP) | 0.325 |
| Fe(ICP) | 0.495 |
| Mg(ICP) | 0.154 |
| Mn(ICP) | 0.539 |
| Na(ICP) | 8.83 |
| Li(ICP) | 0.002 |
| Ni(ICP) | 0.595 |
| Si(ICP) | 9.613 |
| Cr(ICP) | 0.015 |
| B(ICP) | 0.06 |
| U (D-G) | 5.246 |
| Sr(ICP) | 0.004 |
| Zr(ICP) | 0.032 |
| Ti(ICP) | 0.04 |
| K(AA) | 0.122 |
| P(ICP) | 1.548 |
| Ba(ICP) | 0.008 |
| Pb(ICP) | 0.161 |
| Mo(ICP) | 0.011 |
| Zn(ICP) | 0.96 |
| Cu(ICP) | 0.018 |
| Cl(ISE) | 0.113 |
| $SO_4$ (IC) | 0.5 |
| $NO_3$ (IC) | 2.989 |
| % SOLIDS (105° C.) | 35.37 |
| % SOLIDS (90° C.) | 34.43 |

The testing was conducted by admixing the waste material with cement and $FeSO_4$ as a complexant in the amounts shown in Table 2. The test compositions were prepared by admixing the stated amount of waste material with the stated amount of complexant and cement. The cement A was Portland Type I cement and cement B was Portland Type II cement. About 7–20 ml of NaOH solution was added to the mixtures to bring the mixtures to a pH 11. The mixtures were then filtered and washed with the stated amount of rinse water and then filtered again. The resultant filter cake was then allowed to cure for about 24 hours. This filter cake was then tested in accordance with standard EPA test methods as set forth in EPA standard test methods (3d Edition, 1992) "Test Methods for Evaluating Solid Wastes", Physical/Chemical Methods, SW-846, Standard Method #1311, Toxicity Characterization Leaching Process (TCLP). The results for the nickel, uranium, and nitrates are set forth in Table 3.

TABLE 2

| Compositions of Examples | | | | |
|---|---|---|---|---|
| Component | Ex. 1 | Ex. 2 | Ex. 3 | Ex. 4 |
| Waste Material (g) | 608 | 608 | 608 | 608 |
| $FeSO_4$ (g) | 10 | 30 | 20 | 10 |
| Cement A (g) | 46 | 138 | 92 | |
| Cement B (g) | | | | 46 |
| Rinse Water (ml) | 475 | 475 | 475 | 475 |

TABLE 3

| TCLP Results | | | | |
|---|---|---|---|---|
| Tested Species | Ex. 1 | Ex. 2 | Ex. 3 | Ex. 4 |
| Nickel | 0.017 | 0.014 | 0.017 | 0.03 |
| Uranium | ND* | ND* | ND* | ND* |
| Nitrates | 17.4 | 29.1 | 24.7 | 16.3 |

*denotes that values were below detectable limits of the instrumentation.

What is claimed is:

1. A method for the immobilization of hazardous and radioactive species within a waste material, comprising:

(a) providing 100 parts by weight of a waste material comprising water and at least one heavy metal species or at least one radioactive species;

(b) blending said waste material with from about 5–50 parts by weight of cement, and also blending with said waste material a complexant consisting of an iron compound, wherein the weight ratio of elemental iron to cement is from about 1:3 to about 1:50, to form a grout material;

(c) separating excess aqueous fluid from said grout material to form a condensed grout waste; and (d) allowing said condensed grout waste to cure and solidify.

2. The method of claim 1 wherein said iron compound is selected from the group consisting of iron sulfates, iron chlorides, iron phosphates and mixtures thereof.

3. The method of claim 1 wherein the weight ratio of elemental iron to cement is from about 1:5 to about 1:35.

4. The method of claim 1 wherein said iron compound is iron sulfate.

5. The method of claim 4 wherein the weight ratio of elemental iron to cement is from about 1:5 to about 1:35.

6. In a process for the immobilization and solidification of a waste stream wherein said waste stream contains either heavy metal elements, radioactive species, nitrate compounds, or any combination thereof, and wherein said waste stream is admixed with a cement material to form a grout solidification matrix that is allowed to cure for a sufficient period of time, the improvement comprising admixing a complexant into said grout solidification matrix, said complexant consisting of an iron compound, wherein the weight ratio of elemental iron to cement is from about 1:3 to about 1:50.

7. The method of claim 6 wherein said iron compound is selected from the group consisting of iron sulfates, iron chlorides, iron phosphates, and mixtures thereof.

8. The method of claim 6 wherein the weight ratio of elemental iron to cement is from about 1:5 to about 1:35.

9. The method of claim 6 wherein said iron compound is iron sulfate.

10. The method of claim 9 wherein the weight ratio of elemental iron to cement is from about 1:5 to about 1:35.

11. A cured, solidified hazardous or radioactive waste containing material, comprising a waste material comprising at least one heavy metal element, radioactive species, nitrate compound, or mixture thereof, said waste material being disposed within a solidified matrix, said matrix consisting of cement and a complexant consisting of an iron compound, wherein the weight ratio of elemental iron to cement is from about 1:3 to about 1:50.

12. The waste material of claim 11 wherein said iron compound is selected from the group consisting of iron sulfates, iron chlorides, iron phosphates, and mixtures thereof.

13. The waste material of claim 11 wherein the complexant consists of an iron compound and the weight ration of elemental iron to cement is from about 1:5 to about 1:35.

14. The waste material of claim 11 wherein said iron compound is iron sulfate.

15. The method of claim 14 wherein the weight ratio of elemental iron to cement is from about 1:5 to about 1:35.

* * * * *